United States Patent [19]

Castellani

[11] Patent Number: 5,078,665
[45] Date of Patent: Jan. 7, 1992

[54] EPICYCLIC REDUCTION GEARS

[75] Inventor: Giovanni Castellani, Modena, Italy

[73] Assignee: Mape S.P.A., Bologna, Italy

[21] Appl. No.: 644,778

[22] Filed: Jan. 23, 1991

[30] Foreign Application Priority Data

Feb. 6, 1990 [IT] Italy ................. 40018 A/90

[51] Int. Cl.⁵ ........................................ F16H 1/32
[52] U.S. Cl. ............................................ 475/342
[58] Field of Search ................................ 475/342

[56] References Cited

U.S. PATENT DOCUMENTS

| | | | |
|---|---|---|---|
| 3,307,433 | 3/1967 | Bennett et al. | 475/342 |
| 3,633,441 | 1/1972 | Hicks | 475/342 X |
| 3,675,510 | 7/1972 | Duggar, Jr. | 475/342 |
| 4,429,594 | 2/1984 | Heller | 475/342 |
| 4,754,949 | 7/1988 | Fukamachi | 475/342 X |
| 4,850,247 | 7/1989 | Yu | 475/342 |
| 4,850,457 | 7/1989 | Taig | 475/342 X |

FOREIGN PATENT DOCUMENTS 818236 11/1967 Italy.

Primary Examiner—Dirk Wright
Attorney, Agent, or Firm—Lowe, Price, LeBlanc & Becker

[57] ABSTRACT

A reduction unit includes a sun gear (2) which is integral with the driving shaft (1), and is equipped at the two ends of the shaft with two identical toothings (3, 4) which mesh with three free planetary gears (7) which in turn mesh with the fixed (10) and rotary (11) internal ring gears; between these ring gears there is a difference of three teeth.

4 Claims, 3 Drawing Sheets

3
EPICYCLIC REDUCTION GEARS

FIELD OF THE INVENTION

The invention relates to improvements in epicyclic reduction gears, that is to say new results and applications for a type of epicyclic reduction gear with a high transmission ratio.

BACKGROUND OF THE PRIOR ART

The state of the art comprises three types of planetary reduction gears for high transmission ratios:
- simple planetary gearings characterized by two sun pinions with external toothings, or by two internal ring gears;
- planetary gearings with a number of subsequent stages of reduction, each constituted by a sun pinion, two or more planetary pinions and ring gear with internal teeth;
- combined planetary gearings, such as the Wolfrom type, constituted by a sun pinion which functions as driving element, two or more trains, dephased at equal angles, each of two planetary pinions, and two ring gears with internal teeth, one of which is fixed to the casing, whereas the other is rotary and functions as driven element.

The simple planetary gearings, of the first type, have very low efficiency. The planetary gearings with a number of stages, of the second type, have good efficiency but more complicated and bulky structure. The planetary gearings of the third type can be considered intermediate, in the sense that they are more compact than those of the second type, less compact than those of the first type and have average efficiency.

Of these, the Wolfrom type, which is compact and has satisfactory efficiency, has the following disadvantages however:
- the tangential forces exerted by the ring gears on the respective planetary pinions are in opposite directions and tend to misalign the toothings; in the conventional version of the speed reduction unit, this effect is counteracted by bearings accomodated in a suitable cage, but without full effect, because of the clearance and of the elastic yielding of the bearings and of their mountings;
- the toothings of the planetary pinions of the two or more trains, which engage with the two ring gears, have to be brought into phase during manufacture in order that the load is distributed uniformly between them;
- the presence of two planetary pinions of different diameter on the same shaft, for each train, renders impossible, for at least one of them, the operation of grinding of the toothing by means of an abrasive wheel. All these types of epicyclic reduction gears lend themselves only with difficulty to applications in which it is necessary to reduce or eliminate completely the transmission error of the reduction unit, as due to tooth backlash and bearing clearance and understood as the possibility of angular dephasing of the driven shaft for a given position of the driving shaft. This is an increasingly frequent requirement, for example in the field of robotics, in machine tools and work centers and in measurement and control machines—all fields in which a great reduction in speed by means of a single compact reduction unit is also frequently required.

Some attempts to provide epicyclic reduction gears which satisfy only in part said requirement have led to very costly constructions, in that every piece is constructed with the strictest manufacturing tolerances: in particular it is necessary to eliminate the clearance of the bearings and of their mountings.

In order to meet this requirement in a more specific manner, other special types of reduction gears are also used:
- there exist in fact reduction units which are comparable to planetary gearings in that they have movements of epicyclic type, but with toothings of special type and special structures, such as the so-called harmonic drive which came into being essentially for reasons of compactness but is also suitable for the requirement of reducing the transmission error due to the unit play: however, in this case too, by means of the adoption of the strictest manufacturing tolerances and high costs also for intrinsic reasons of structure; in other cases, reduction units have been adopted, also with epicyclic movements, which can be classified as cam-type reduction units and are capable of carrying out great reductions in speed: with high costs, moreover, especially if there is a requirement to reduce the play, which can be met only by means of the adoption of strict manufacturing tolerances;
- there exist also planetary reduction units which have toothings of the usual type, but special structures which are capable of allowing the adjustment and if necessary the elimination of the play: expensive, therefore, because of structure and bulky in that the presence of the adjustment devices impedes the utilization of the space for the transmission of the power, so that greater sizes are required in parity with power transmitted.

This prior state of the art is capable of considerable improvements with regard to the possibility of eliminating—or in any case greatly reducing—the disadvantages listed above.

From the above, the necessity is derived of the solving of the technical problem of finding an epicyclic reduction unit such as, for example, is required in robotics, without play which results from the tolerances on the thicknesses of the teeth, on the rings of the bearings and on the mountings of the rings of the bearings, or, in any case, of very reduced play in order to eliminate the disadvantages of the Wolfrom reduction unit, without the possibility of misalignments of toothing, without any necessity for bringing the toothings into phase at the time of manufacture and such as enables the operation of grinding of the toothings of all the pinions, all this without having recourse to toothings and to structures which are not common.

SUMMARY OF THE INVENTION

These and other objectives and benefits of this invention are realized by providing an improved epicyclic reduction unit comprising:
- a casing with a fixed internally toothed first ring gear;
- a driving shaft formed to have a coaxial sun gear;
- a driven shaft provided with an internal bell supporting a rotary internally toothed second ring gear;
- wherein said ring gears both mesh with said plurality of planetary gears,
- wherein the sun gear is divided into two indentical parts which mesh with the plurality of planetary gears at longitudinal ends thereof, and wherein said planetary gears are disposed so as to be free to rotate between the sun gear and the ring gears, and are formed longer than required for engagement with the ring gears, there being between said first and second ring gears a difference in the number of teeth equal to the number of the planetary gears.

The invention solves the abovementioned technical problem by adopting a sun gear which is divided into two identical parts, worked in one single cycle, which engage with planetary gears at the longitudinal ends of the latter and are integral with the driving shaft, said planetary gears, inserted so as to be free between the sun gear and the internal ring gears, i.e. the fixed and the rotary ones, being longer than is required for the engagement with the ring gears themselves, there being between said ring gears a difference in the number of teeth equal to the number of the planetary pinions, suitably three, which, however, are the same; the teeth are advantageously of the involute type with addendum modifications; the two ring gears mesh with the planetary gears in the central region of the latter, or in the central region and at the two ends, or even, practically, over the entire length.

The advantages achived by this invention are: use of a reduction unit of the Wolfrom type without, moreover, use of internal bearings and of cages for the planetary gears, without the disadvantage of misalignments of toothing, without the bringing into phase of the toothings of the pinions being required, without having to adopt either special toothings or structures, allowing also the operation of grinding of all the planetary gears; greater compactness; less bulkiness; lower cost; elimination of maintenance; furthermore, the division of the toothing of the sun gear into two indentical parts leads surprisingly to a reduction of the intensity of the forces applied on the planetary gears by the toothings of the sun gear allowing the alignment of the planetary gears with respect to the axis of the reduction unit and, as a consequence, to a reduction of the friction generated by said forces and an increase of the efficiency of the reduction unit; furthermore, also the embodiment of the reduction unit in which the two ring gears mesh with the planetary gears in the central region and at the two ends, or over the entire length, leads surprisingly to a reduced friction, an increased efficiency of the reduction unit and a reduced noise, making possible, in addition, an auto-centering of the planetary gears on the ring gears instead of the sun gear.

BRIEF DESCRIPTION OF THE DRAWINGS

Some embodiments of the invention are illustrated, by way of example only, in the three drawing plates attached, in which.

Figure 1:
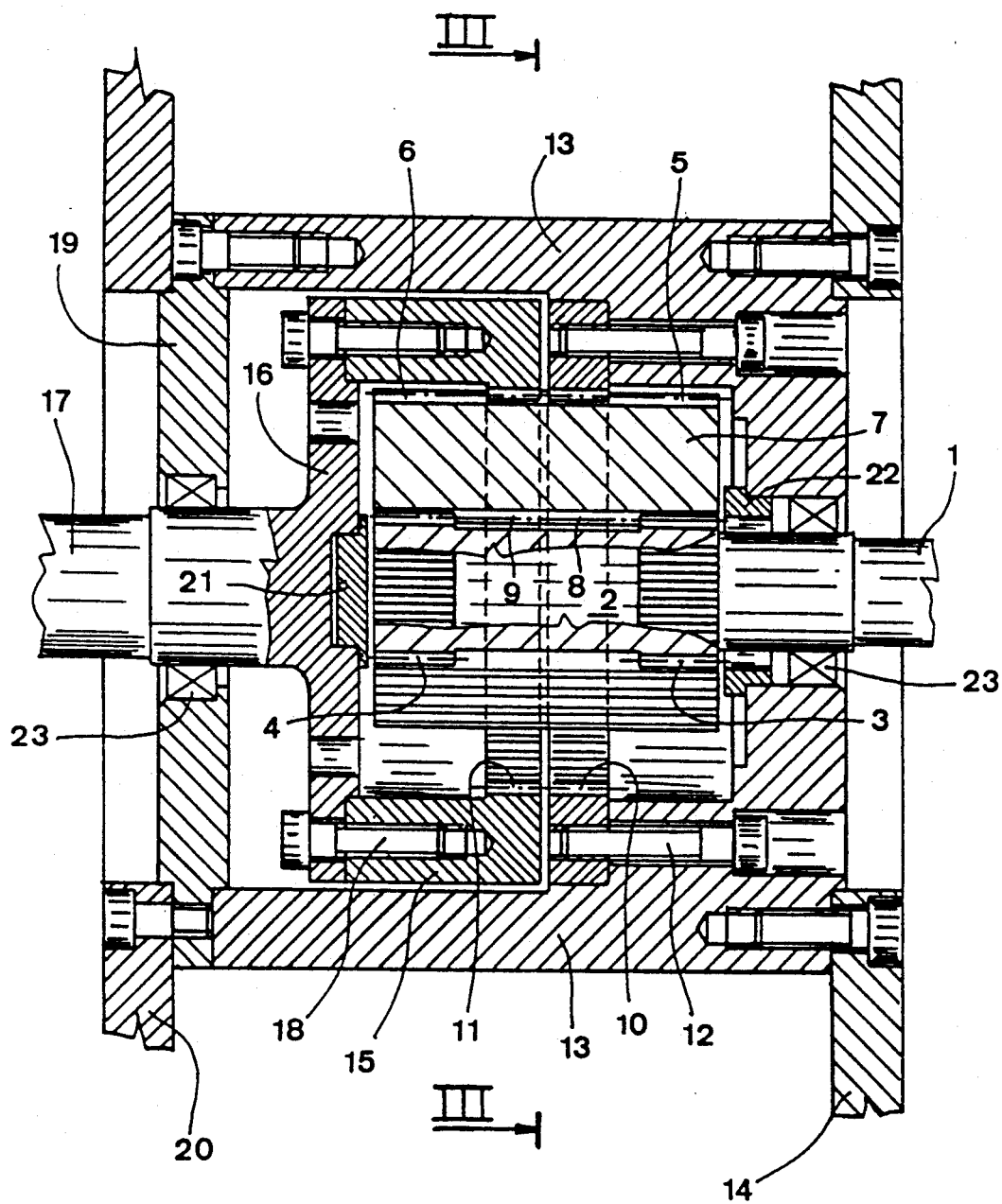
FIG. 1 is an axial longitudinal cross-section of the reduction unit according to the invention.

DETAILED DESCRIPTION OF THE PREFERRED EMBODIMENTS 1 indicates the input shaft, the continuation of which 2 is equipped bilaterally with sun toothed rings 3, 4 which mesh respectively with the toothed end rings 5, 6 of the planetary gears 7, these latter constituting the centering for said shaft; 8, 9 indicate two toothed rings of the intermediate region of the planetary gears 7 which engage with respective ring gears which have internal toothing 10, 11, the first fixed by means of longitudinal screws 12 to the inside of the casing 13, possibly equipped with a front flange 14 for the motor, the second forming part of a bell which has a cylindrical part 15 and hub 16 constituting the end of the driven shaft 17; 18 indicates the screws for assembly of the cylindrical part on the hub of said bell; 19 indicates the cover of the casing, possibly also fixed to a flange 20 of the driven machine; 21, 22 indicate two axial stops of the rotor, constituted by the sun gear and by the planetary gears, inserted respectively inside the hub 16 and in the center of the casing 13, this latter having a hole for the passage of the shaft 1; 23 indicates sealing rings. It must be observed that, in relation to the fixed internal ring gear 10, the rotary internal toothing 11 can have three teeth more, or three teeth less, when there are three planetary gears, that is to say a difference in teeth equal to the number of the planetary gears.

Figure 2:
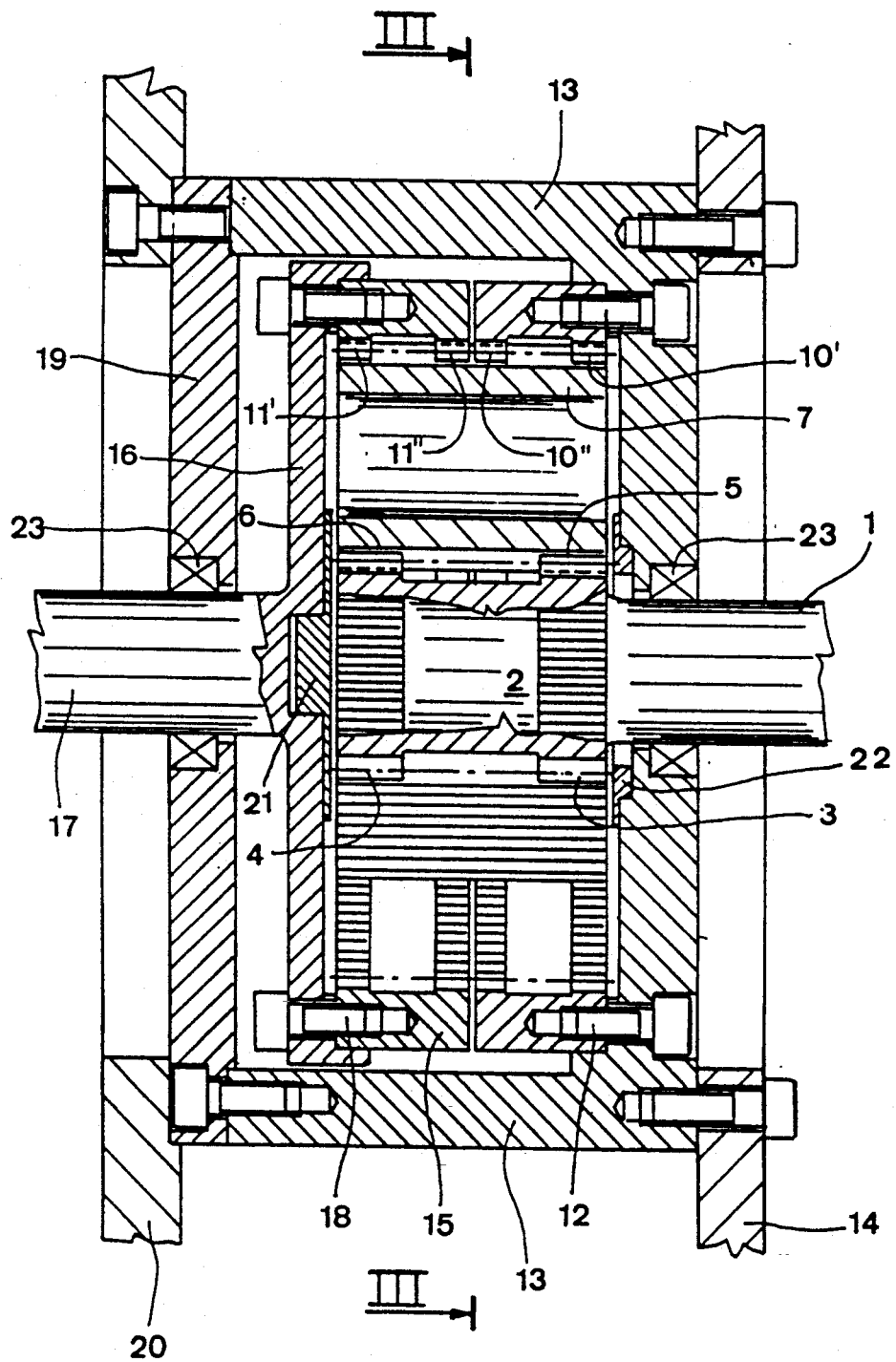
FIG. 2 is a cross-section like that in FIG. 1, in the case of an alternative according to which the centering is moved from the sun gear to the ring gear.
Figure 3:
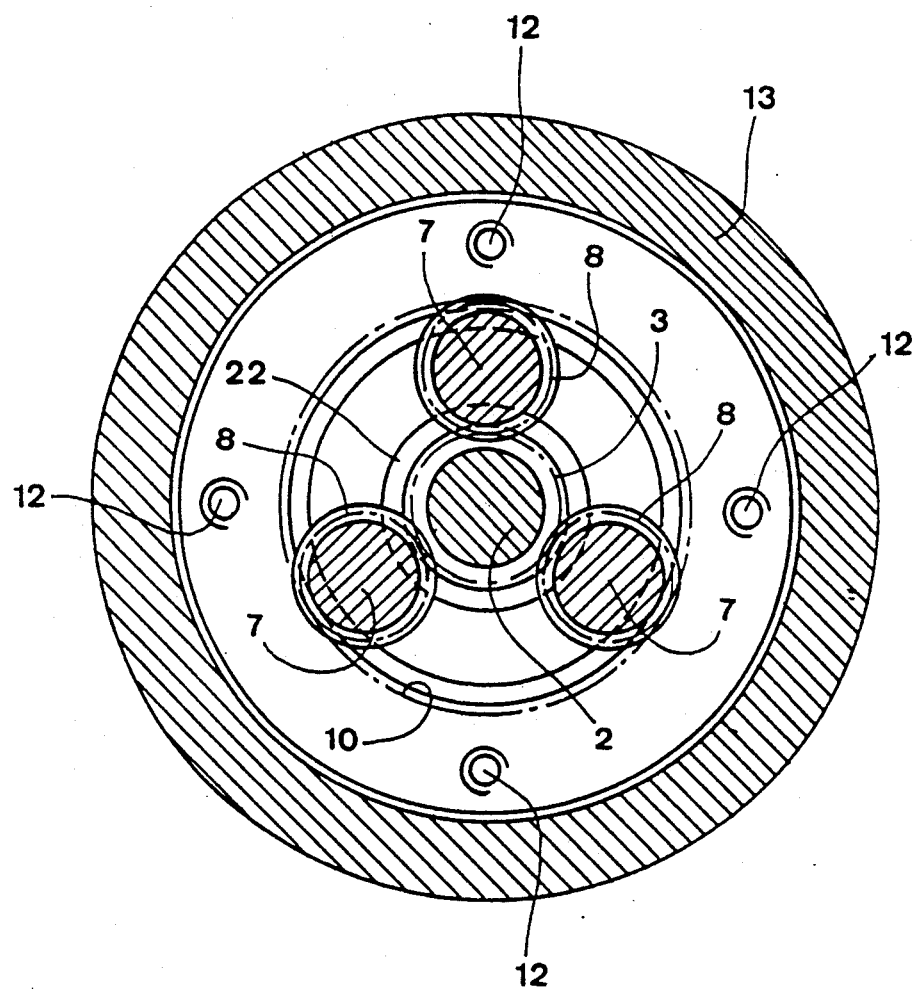
FIG. 3 is the transverse cross-section III—III of FIGS. 1,2.

In the case of the alternative in FIG. 2, the internal toothings 10, 11 can each be subdivided into two rings 10', 10'' and 11', 11'' distributed at the two ends of the associated ring gear; otherwise, the same toothings 10, 11 could also be extended over the entire axial length of the respective ring gears in order to obtain the centering of the rotor in the ring gears themselves.

The toothings of the sun and planetary gears are preferably hardened by means of gaseous nitriding and ground; those of the ring gears can be broached.

The reduction unit is intended to be inserted between a motor and a driven machine.

The casing 13 can be rigidly connected to the motor, or can be provided with means of being rigidly connected to the driven machine.

The driving shaft 1 is torsionally connected to the motor by suitable means, or can be inserted in external bearings so as to be driven by means of transmission which exerts a radial load.

The driven shaft 17 can be torsionally connected to the driven machine by means which are suited to avoiding angular play, or can be inserted in external bearings in order to allow a transmission which exerts a radial load on the shaft; axial displacement towards the outside has to be prevented.

The toothings 3, 4 of the sun pinions and 5, 6 of the planetary gears 7 are maintained in a position of correct engagement by means of axial stops 21, 22.

The functioning takes place in the following manner: the sun gears 3,4 compel the planetary gears 7 to rotate in epicyclic motion within the fixed ring gear 10; because of the difference of 3 teeth between the ring gears 10, 11, the latter is drawn in slow rotation; as the transmission ratio (input speed/output speed) is $$i=(1+Z_{10}/Z_3)/(1-Z_{10}/Z_{11}),$$

if $Z_{10}$ is less than $Z_{11}$, this ratio is positive (same direction of rotation of the shafts 1, 17), whereas it is negative for $Z_{11}$ less than $Z_{10}$.

If, for instance, the number of teeth of the fixed ring gear 10 is $Z_{10}=72$, the number of teeth of the rotary ring gear 11 is $Z_{11}=75$ and the number of teeth of the sun pinion 3 is $Z_3=24$, the transmission ratio will be i = +100, with the shafts 1, 17 rotating in the same direction.

By selecting the thickness of the teeth of the sun gears 3, 4, it is possible, upon assembly, to adjust the backlash of the teeth, or to eliminate it and obtain a slight forcing; this can be brought about by arranging a set of pinions of the sun gear 2 having toothings 3 and 4 with differetiated tooth thickness and by using them according to the combinations of the tolerances of the toothings 5, 6 of the planetary pinions and of those internal toothings of the ring gears, for these latter the tolerances on the thickness of the teeth having to be restricted, to avoid that the backlashes or the forcings of the ring gears, when mating with the planetary gears, are different from one another. With reference to the above mentioned example, assume that the metric module is 1.25 mm and the base tangent length (so-called Wildhaber measure) over four teeth of the sun gear is 13.76 mm. The base tangent length defines the tooth thickness indirectly. A set of sun gears will be manufactured, having base tangent length differing of 0.01 mm from one another, for instance: $13.76^{+0.02}$, $13.76^{+0.01}$, $13.76^{+0}$, $13.76^{-0.01}$, ..., $13.76^{-0.06}$.

In a given reduction unit, taking into account the thicknesses of the teeth of the planetary gears 5, 6 and internal toothings 10, 11 obtained within the working tolerances, the sun gear more suitable to obtain the desired interference or backlash will be mounted.

In the case of forcing of the toothings, the sun and planetary pinions are tight and auto-centering in the ring gears, thus avoiding misalignment.

In the case of backlash between the teeth, the auto-centering is provided for by the greater distance between the pinions 3, 4 in relation to that between the ring gears 10, 11 in the case of FIG. 1, or the distribution in FIG. 2, or, otherwise, the possible solution which envisages the two ring gears with toothing extended over their entire width, in order to obtain the centering of the planetary gears on the ring gears themselves.

The condition of equilibrium of the reduction gear are such that, in the event of backlash between the toothings, the misaligning moment generated by the reactions of the internal toothings on the planetary gears is balanced by a moment having the same value and opposite direction, generated by the forces applied on the planetary gears 5, 6 by the toothings 3, 4 of the sun gear. If there is backlash between the toothings 3, 4, of the sun gear and the toothings 5, 6, of the planetary gears, the lever arm of said forces is greater and the moment balancing the misaligning moment is obtained by means of forces of less intensity, which is advantageous for the efficiency. In addition, said forces, being of low intensity, have radial components less than the components of the forces applied to the planetary gears 7 by the internal toothings 10, 11, so that an auto-centering of the planetary gears 7 on the sun gears 3,4 is obtained; furthermore, said low intensity leads to a not important value of the associated friction—for the purpose of the efficiency of the reduction unit it is compensated by the absence of internal bearings.

In a practical embodiment, the materials, the dimensions, the details of execution, the geometrical types of toothings, the methods of working on the machine tools, the heat treatments, can be different from those indicated, but technically equivalent to these, without thereby leaving the legal domain of the present invention.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. An improved epicyclic reduction unit, comprising:
   a casing with a fixed internally toothed first ring gear;
   a driving shaft formed to have a coaxial sun gear;
   a driven shaft provided with an internal bell supporting a rotary internally toothed second ring gear;
   wherein said ring gears both mesh with said plurality of planetary gears,
   wherein the sun gear is divided into two identical parts which mesh with the plurality of planetary gears at longitudinal ends thereof,
   and wherein said planetary gears are disposed so as to be free to rotate between the sun gear and the ring gears and are formed longer than required for engagement with the ring gears, there being between said first and second ring gears a difference in the number of teeth equal to the number of the planetary gears.

2. The unit as claimed in claim 1, wherein:
   the first and second ring gears comprise rings which are disposed close to one another in a central region of the reduction unit.

3. The unit as claimed in claim 1, wherein:
   the first and second ring gears are each axially subdivided into two ring portions, with one subdivided ring of each disposed adjacent to each other in the central region of the reduction gear and the other of the subdivided ring portions being disposed adjacent opposite ends of the casing.

4. The unit as claimed in claim 1, wherein:
   the toothing of each of the ring gears extends essentially over their respective entire widths, for mating with essentially half the length of the toothing of the plurality of planetary gears.

* * * * *